US005528310A

United States Patent [19]

Peters et al.

[11] Patent Number: 5,528,310
[45] Date of Patent: Jun. 18, 1996

[54] METHOD AND APPARATUS FOR CREATING MOTION PICTURE TRANSITIONS ACCORDING TO NON-LINEAR LIGHT RESPONSE

[75] Inventors: Eric C. Peters, Carlisle; Robert A. Gonsalves, Wellesly, both of Mass.

[73] Assignee: Avid Technology, Inc., Tewksbury, Mass.

[21] Appl. No.: 230,050

[22] Filed: Apr. 19, 1994

Related U.S. Application Data

[63] Continuation-in-part of Ser. No. 49,028, Apr. 16, 1993, Pat. No. 5,440,348.

[51] Int. Cl.$^6$ .................................................. H04N 9/74
[52] U.S. Cl. ................................................. 348/593; 348/590
[58] Field of Search .................................... 348/590, 593, 348/594, 595, 598, 599, 722; 360/14.1; 358/311, 335; H04N 9/74, 9/76, 5/222

[56] References Cited

U.S. PATENT DOCUMENTS

| | | | |
|---|---|---|---|
| 4,205,346 | 5/1980 | Ross | 348/722 X |
| 4,538,188 | 8/1985 | Barker et al. | 360/14.1 |
| 4,612,569 | 9/1986 | Ichinose | 348/588 |
| 4,685,003 | 8/1987 | Westland | 360/14.1 |
| 4,698,664 | 10/1987 | Nichols et al. | 358/311 |
| 4,858,011 | 8/1989 | Jackson et al. | 348/722 X |
| 4,937,685 | 6/1990 | Barker et al. | 360/14.1 |
| 4,956,725 | 9/1990 | Kozuki et al. | 360/14.3 |
| 4,964,004 | 10/1990 | Barker | 360/14.1 |
| 4,972,274 | 11/1990 | Becker et al. | 360/14.1 |
| 4,979,050 | 12/1990 | Westland et al. | 360/14.1 |
| 5,040,066 | 8/1991 | Arbeiter et al. | 348/590 |
| 5,077,610 | 12/1991 | Searby et al. | 348/593 |
| 5,109,482 | 4/1992 | Bohrman | 395/154 |
| 5,111,409 | 5/1992 | Gasper et al. | 395/152 |
| 5,126,851 | 6/1992 | Yoshimura et al. | 358/335 |
| 5,189,516 | 2/1993 | Angell et al. | 348/588 |
| 5,191,645 | 3/1993 | Carlucci et al. | 395/159 |
| 5,194,952 | 3/1993 | Pelley | 348/594 |
| 5,305,438 | 4/1994 | MacKay et al. | 395/164 |
| 5,353,391 | 10/1994 | Cohen et al. | 395/125 |
| 5,388,197 | 2/1995 | Rayner | 395/154 |

FOREIGN PATENT DOCUMENTS

| | | | |
|---|---|---|---|
| 0113993 | 7/1984 | European Pat. Off. | G11B 27/02 |
| 0268270 | 5/1988 | European Pat. Off. | G11B 27/02 |
| 0390048 | 10/1990 | European Pat. Off. | G11B 27/00 |
| 0438299 | 7/1991 | European Pat. Off. | G11B 27/034 |
| 473322 | 4/1992 | European Pat. Off. | H04N 3/36 |
| 0526064 | 2/1993 | European Pat. Off. | G11B 27/028 |
| 923066153 | 3/1993 | European Pat. Off. | G11B 27/028 |
| 2235815 | 3/1991 | United Kingdom | G11B 27/028 |

OTHER PUBLICATIONS

C. A. Pantuso, "Reducing financial aliasing in HDTV production", Better Video Images, 23rd Annual SMPTE Conference, 3–4 Feb. 1989, San Francisco, CA, pp. 157–169.

Rangan, P. V. et al.; A Window–Based Editor for Digital Video and Audio; 1992, pp. 640–648; IEEE.

Mackay, W. E. and Davenport, G.; Virtual Video Editing in Inter-active Multimedia Applications; Jul./1989; pp. 802–810; Comm of ACM.

Krieg, P.; Multimedia–Computer und die Zukunft des Film/ Videoschnitts; 1991; pp. 252–258; Fernseh–und Kino–Technik.

Norton, M. J.; A Visual EDL System.

Green, J. L.; The Evolution of DVI System Software; Jan./1992; pp. 53–67; Communications of the ACM.

The O.L.E. Partnership; Lightworks Editor (Advertisement).

*Primary Examiner*—Victor R. Kostak
*Assistant Examiner*—John W. Miller
*Attorney, Agent, or Firm*—Wolf, Greenfield & Sacks

[57] ABSTRACT

Creating a transition between a first sequence of video frames and a second sequence of video frames. The method includes storing a table of values that express a non-linear response to certain levels of light, generating a transition between the sequences, and adjusting the intensity at which material of the first sequence is displayed relative to the intensity at which material of the second sequence is displayed within the transition, based on the values stored in the step of storing.

35 Claims, 6 Drawing Sheets

METHOD AND APPARATUS FOR CREATING MOTION PICTURE TRANSITIONS ACCORDING TO NON-LINEAR LIGHT RESPONSE

RELATED APPLICATIONS

This application is a continuation in part of an earlier filed application entitled "METHOD AND USER INTERFACE FOR CREATING, SPECIFYING AND ADJUSTING MOTION PICTURE TRANSITIONS", filed on Apr. 16, 1993 under Ser. No. 08/049,028, now U.S. Pat. No. 5,440,348 by Eric C. Peters and Joseph H. Rice.

FIELD OF THE INVENTION

The invention relates generally to systems and methods for editing and composing motion picture material, and more particularly to operations on transitions between scenes in such material.

BACKGROUND OF THE INVENTION

In assembling individual motion picture (i.e., film or video) scenes into larger compositions, the scenes are linked together by transitions. Most transitions are simple cuts, but a significant number are other forms of gradual transitions. These include dissolves (or cross-fades), wipes, and various specialized transitions such as blends, rotations and peels.

In a dissolve, a first scene is gradually dimmed while a second scene is gradually brightened, so that the viewer sees the transition as a continuous shift from the first scene to the second scene. During all of the types of gradual transition effect, as the term is to be understood in the context of this application, the first scene and second are both visible to some extent at the same time. For example, in a wipe, part of the second scene is displayed in a portion of the first scene, and this portion is gradually made larger until the second scene occupies the entire display area.

Preparing gradual transitions using 35 mm motion picture film is generally performed by specialized laboratories. 16 mm transitions are prepared using a technique called A-B rolling, in which two prints of the film are prepared with alternating scenes and then combined to yield the gradual transitions. Both of these techniques usually require the film to be conveyed to a processing laboratory in order to generate the transition in final form.

Video editing and composition systems also allow for the creation of transitions. In these systems, it is known to specify a gradual transition by its centerpoint. By centerpoint is meant the point in time within the transition half way between the beginning and end of the transition. The editor manipulates the transition much like a cut, but upon playback, the transition begins before the centerpoint, and ends after the centerpoint. The user may also manually generate the transition using an effects bar control, which is a control lever that often resembles a joystick. This allows the user to control the rate at which the transition takes place. These manually-generated transition profiles may also be stored.

It is also known To display a series of independent monitors with the material from the first scene above a second series of independent monitors with the material from the second scene. In the top row, each monitor shows a successive frame of the first scene, and in the bottom row, each monitor shows a corresponding successive frame of the second scene. This system may allow the user to view several frames from each scene in a transition simultaneously. The Montage Picture Processor system, available from Montage R&D Corp. of Littleton, Mass. uses this approach.

SUMMARY OF THE INVENTION

In general, the invention pertains to a transition editing method for creating a transition between a first sequence of video frames and a second sequence of video frames. The method includes storing a table of values that express a non-linear response to certain levels of light, generating a transition between the sequences, and adjusting the intensity at which material of the first sequence is displayed relative to the intensity at which material of the second sequence is displayed within the transition, based on the values stored in the step of storing.

In another general aspect, the invention pertains to the editing of transitions between sequences of video frames. This includes simultaneously displaying the frames in the first and second sequences at the beginning of the transition, and the frames in the first and second sequences at the end of the transition. The position of two of the four frames may then be altered in their respective sequence to redefine the transition in response to move commands. The rate of change within the transition may also correspond to a predefined film characteristic.

The transition editing method of the invention allows for efficient, versatile and precise editing of motion picture source material. Because the first and last frames of the two scenes in the transition are both shown, it is easy for the user to see material that is not intended to be part of the transition. Such material may include booms, slates, microphones and the like. These unintended events might otherwise be hard to see, especially at the edges of the transitions where one of the scenes may be quite dim. The controls and displays of the invention are also meaningfully and efficiently laid out. The film-matching transition feature of the invention allows an editor to edit video tape using transitions that are similar to film transitions, to achieve a more film-like effect on a video copy. This enables the user to accurately preview material on the computer that is ultimately to be printed on film, without the cost and delay of laboratory work. Alternatively, the user can experiment with different types of transition characteristics, to achieve desired aesthetic effects.

BRIEF DESCRIPTION OF THE DRAWINGS

For a better understanding of the present invention, together with other and further objects, advantages and capabilities thereof, reference is made to the accompanying drawings, which are incorporated herein by reference and in which.

DESCRIPTION OF THE PREFERRED EMBODIMENT

Figure 1:
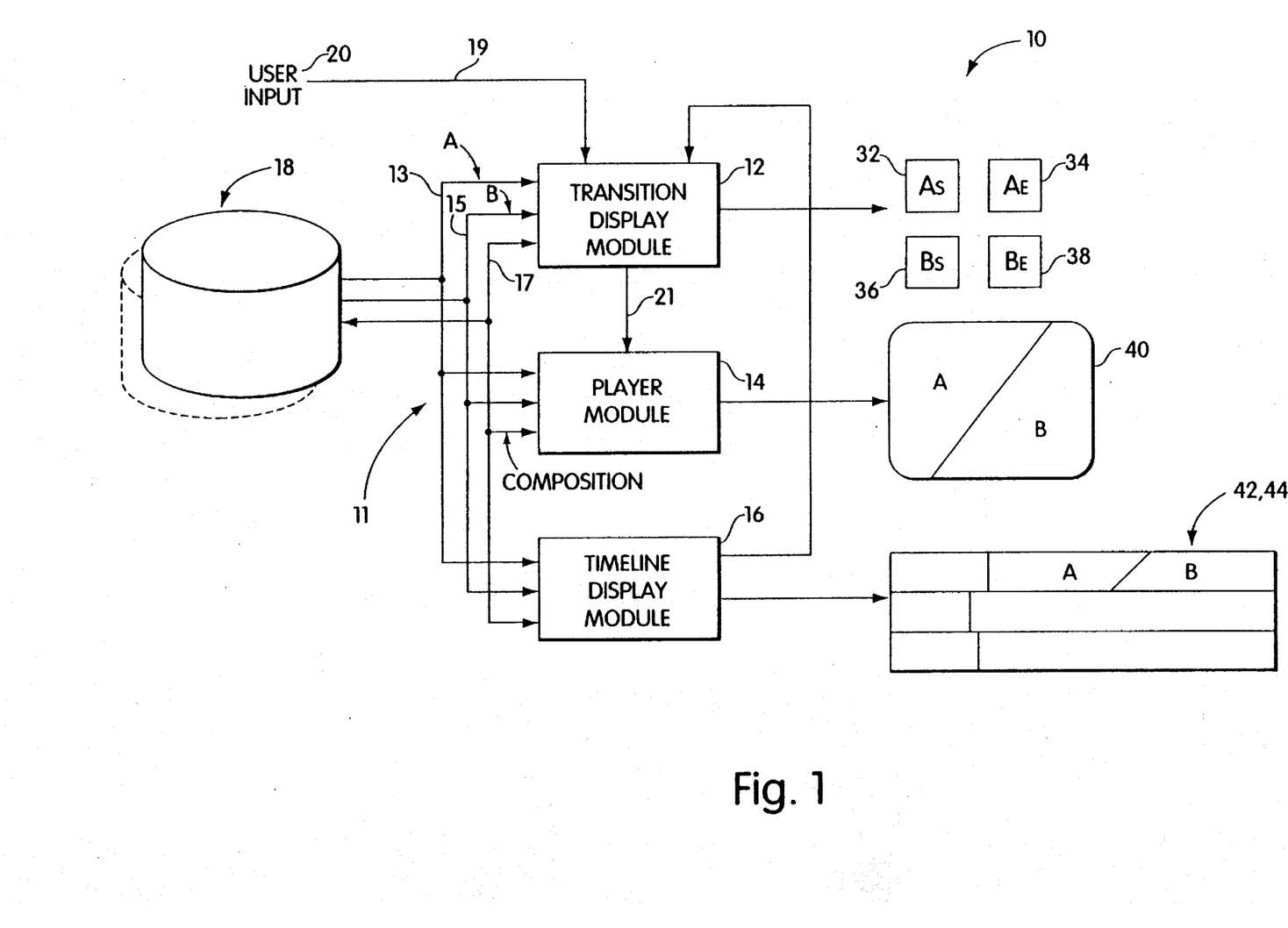
FIG. 1 is a block diagram of a motion picture composing system according to the invention.

Referring to FIG. 1, an exemplary motion picture composition system 10 according to the invention includes a transition display module 12, a player module 14, and a timeline display module 16. A data path 11 links a storage unit 18 with these modules. This data path may be broken down into several data lines 13, 15, 17. These data lines may be dedicated to different synchronized media channels, such as video, audio, and composition channels. These lines need not be separate physical lines. An input data path relays user input from a user input device 20, such as a pointing device, to the transition display module. The transition display module 12 relays transition display window information to transition display windows 32, 34, 36, 38 (see FIG. 2). The transition display module also relays transition information 21 to the player module 14, which will enable the player module to play back the entire transition on a transition playback display window 40. The timeline display module generates timeline information to be displayed on the display as a pair of timelines 42, 44. The timeline display module also provides information about user-initiated changes of transitions to the transition display module.

A system according to the invention may be developed using a variety of types of computer systems. In one embodiment, an Apple Macintosh and the "C" computer language were used, but naturally the invention should not be read to be limited to this particular platform. The transition display module 12, player module 14 and timeline display module 16 may be implemented in software and/or hardware and may or may not be contained within the computer system. A software package entitled "Avid Media Composer", available from Avid Technology, Inc. of Tewksbury, Mass. includes some of these features. The storage may include a high-speed, high-capacity internal magnetic hard disk drive. For further information on computer-based media storage and playback of video and audio information, see Peters et al., "VIDEO AND AUDIO TRANSMISSION SYSTEM AND METHOD", U.S. Pat. No. 5,045,940, issued Sep. 3, 1991, herein incorporated by reference.

Figure 2:
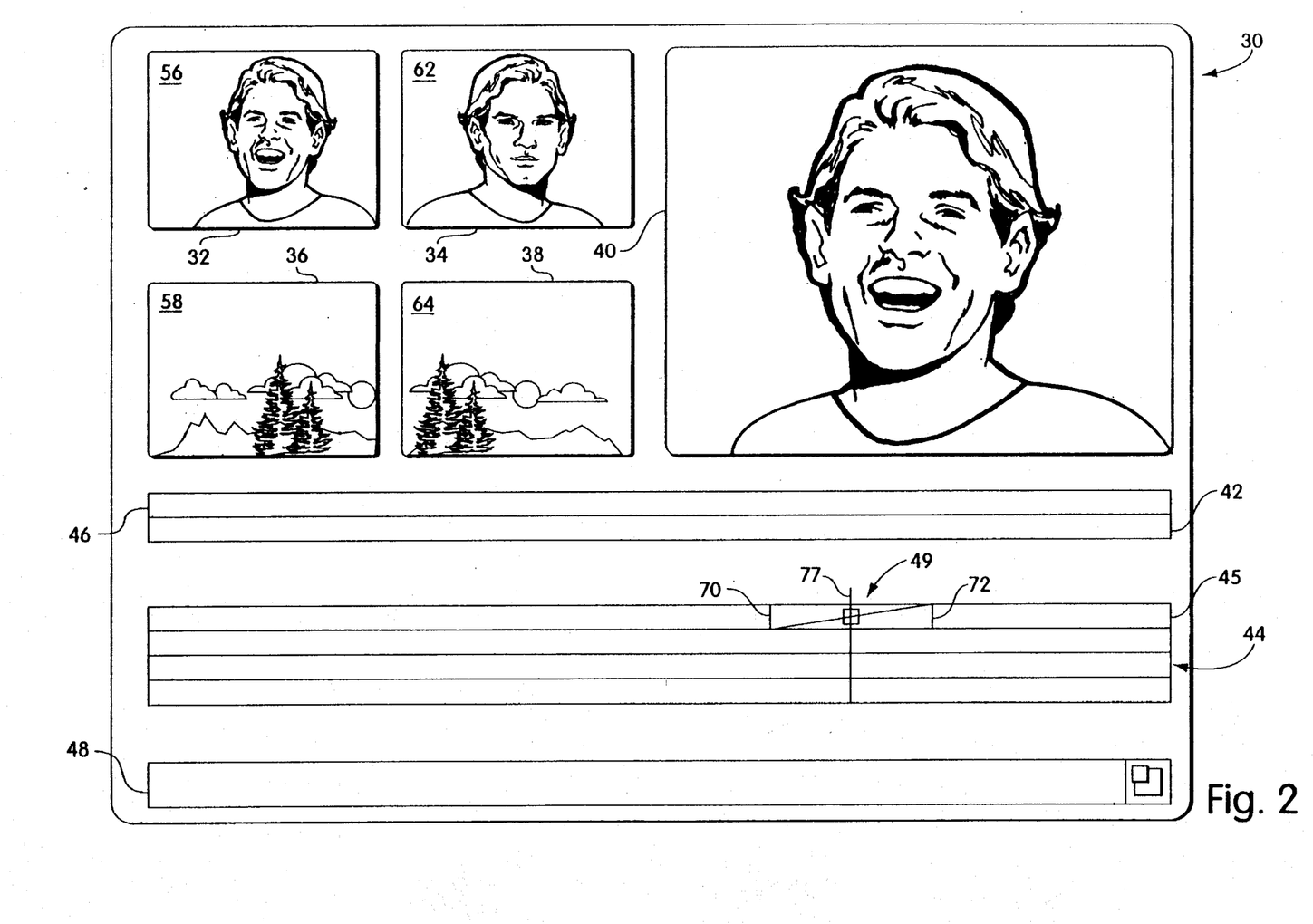
FIG. 2 is a drawing of an exemplary interface screen for the system of FIG. 1.

Referring to FIG. 2, the display interface 30 presented by the composition system to the user includes a series of four transition definition display windows 32, 34, 36, 38. The interface also includes a transition playback display window 40, a coarse timeline 42, a fine timeline 44, a command bar 46, and a mode bar 48.

Figure 3:
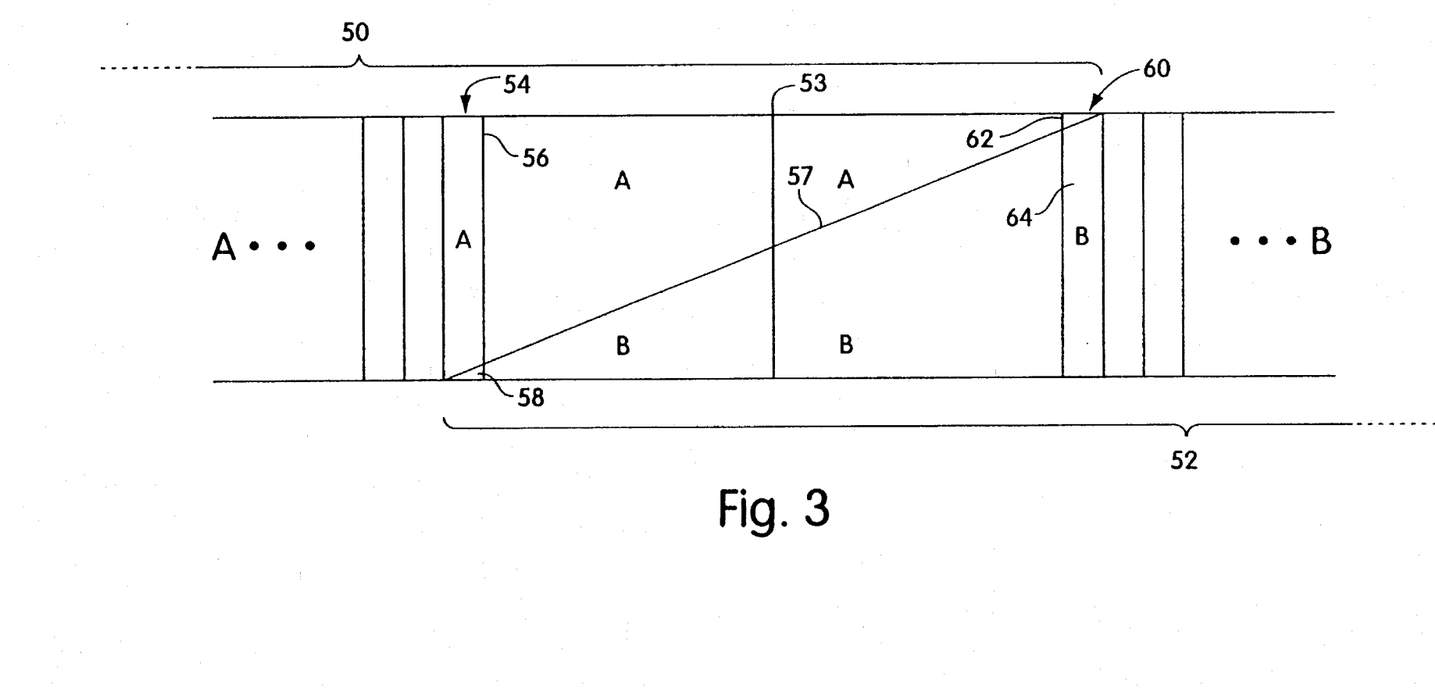
FIG. 3 is a schematic representation of a transition.

Referring to FIGS. 2 and 3, the transition between a first scene "A" 50 and a second scene "B" 52 begins where a first frame position 54 starts to include material from both of the scenes. In the case of a dissolve, this first frame position will show a frame 56 from the first scene at the same time as a frame 58 from the second scene. In this first frame position, the frame from the first scene will be displayed much more brightly than the frame from the second scene. As the dissolve continues, frames from the first scene will become dimmer as frames from the second scene become brighter. At a final frame position, a last frame 62 from the first scene will be displayed much more dimly than the corresponding frame 64 from the second scene. This type of transition is symbolized by a diagonal line 57 representing this gradual shift.

The transition definition display windows each correspond to frame positions either at the beginning 54 or the end 60 of The transition. The first window 32 of FIG. 2 displays the first frame 56 from the first scene in the transition. The second window 34 displays the last frame 62 from the first scene in the transition. The third window 36 displays the first frame 58 from the second scene in the transition. The fourth window displays the last frame 64 from the second scene in the transition.

In operation, a user of the composing system of the invention will first manipulate the coarse timeline 42 to determine the rough area in which the transition is to be added. The user may then manipulate the fine timeline 44 to define a precise position for the edit. Using a mouse or other computer input device, the user may select two scenes to be displayed and place them in a composing area 45 of the timeline. To then create a gradual transition, the user may select one of a series of transition types and drag it to a position between the two scenes on the composition track 45 of the timeline. The system thereafter displays the transition as a Transition control box 49.

The user may then drag the transition start control line 70 to move the start of the transition earlier or later in time. Similarly, the user may move the end transition control line 72 to end the transition earlier or later in time. In moving the transition start line 70, the first transition display window 32 will display an earlier frame of the first scene. The third transition window 36 will also display an earlier frame of the second sequence. Moving the transition end control line 72 similarly affects the second 36 and fourth 38 transition display windows.

The user may also move the central transition position 53 of the first scene. This may be done by manipulating the central transition command line 77 on the fine timeline. When the user moves the center of the transition for the first scene in this way, the first and second transition display windows 32, 34 are updated correspondingly, but the third and fourth transition display windows do not change. This allows the user to start the transition at a different time within the first scene.

Similarly, the user may move the center control for the second scene. This may be done with the central transition command line 77 modified by a mode control. In response to this command, the third transition display window 36 and the fourth transition display window 38 will be updated, leaving the first and second transition display windows 32, 34 unchanged. This allows the user to change the point in the second scene at which the transition begins. The user may also move both transition centers at the same time, in a similar manner. The user may play the whole transition on the playback display window at any time, under control of the command bar 46.

Figure 4:
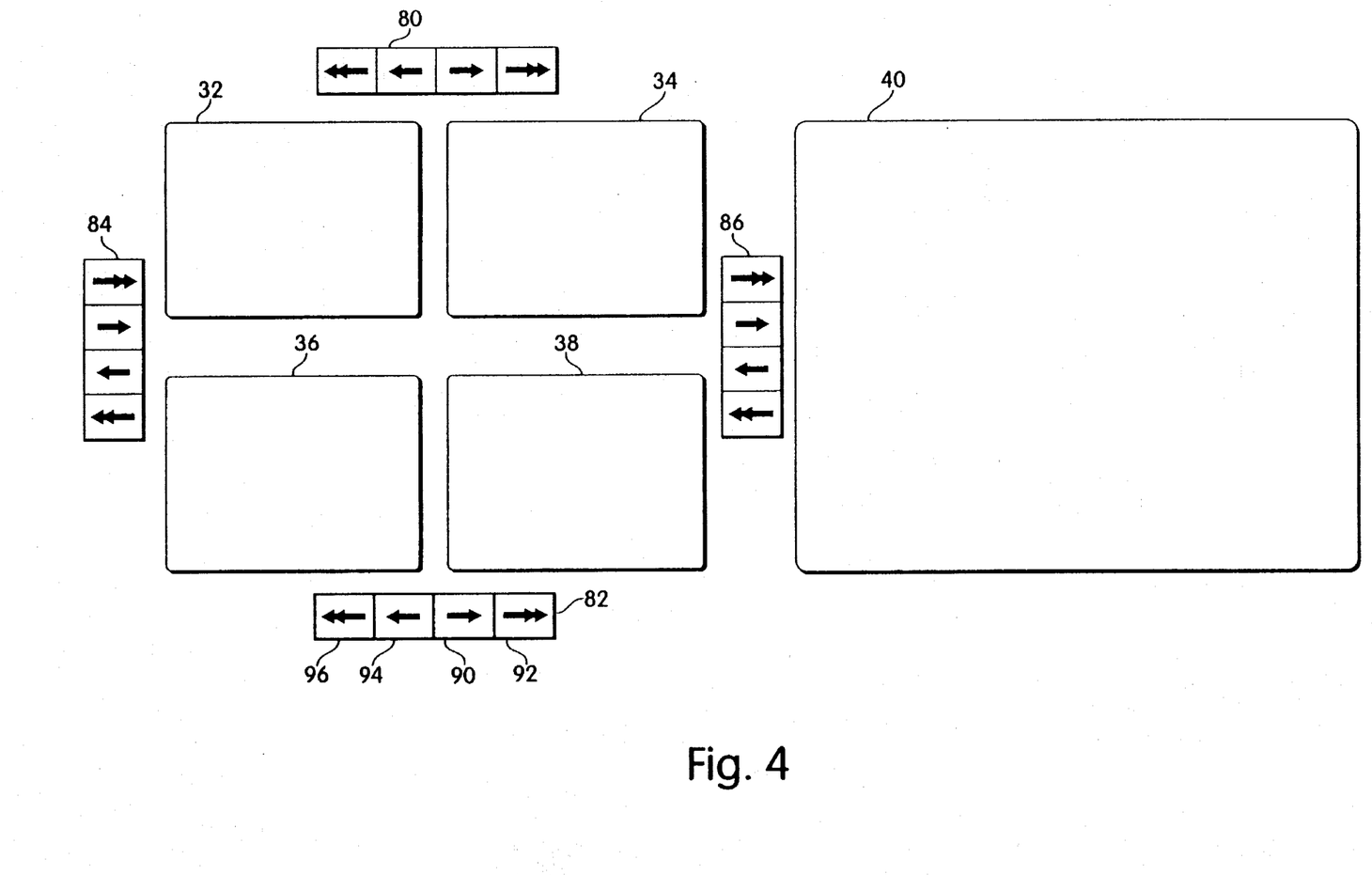
FIG. 4 is an alternative embodiment of display portions of the screen of FIG. 2.

Referring to FIG. 4, an alternative embodiment of the invention also includes four transition display windows and a playback window. In this embodiment, however, a series of four button bars 80, 82, 84, 86 are provided in a pattern surrounding the display windows. A button bar is an area of the screen containing "buttons" or control areas, which respond to user input from a pointing device.

The first button bar 80 is placed above the first and second transition display windows and centered on a line roughly between them. The second button bar 82 is placed below the third and fourth transition display windows and centered on a line roughly between them. The third button bar is placed to the left of the first and third transition display windows and centered on a line roughly between them. The fourth button bar is placed to the right of the second and fourth transition display windows and centered on a line roughly between them. This arrangement and the corresponding functionality allow for efficient editing and are easy to understand.

The button bars may each include a series of control icons or buttons. In one embodiment, each button bar includes four buttons 90, 92, 94, 96. A first 90 of these buttons is a single frame advance button, which permits the user to step through the motion picture material to be displayed one frame at a time. A second button 92 is a multiple frame advance button, which allows the user to advance through the material at a rate of approximately 0.3 seconds per actuation. Conversely, a single frame reverse button 94 and multiple frame reverse button 96 are also provided. Other controls may also be provided on the button bars, as discussed later in the present specification.

The first button bar 80 controls the centerpoint of the transition for the first scene, and the second button bar 82 controls the centerpoint of the transition for the second scene. The third button bar 84 controls the start of the transition for both scenes, and the fourth button bar 86 controls the end of the transition for both scenes. By clicking on the button bars, the user may therefore quickly adjust the parameters of the transition.

Other control arrangements are possible. For example, one button bar might be provided for each of the transition display windows, allowing the user to manipulate the position of each frame position individually. Another possible approach is to provide a second display window, similar to the display window 40. These two display windows can be used to individually, but simultaneously, play back the portions of the two scenes in the transition. They can be placed one above the other between the first and second, and the third and fourth transition display windows.

Figure 5:
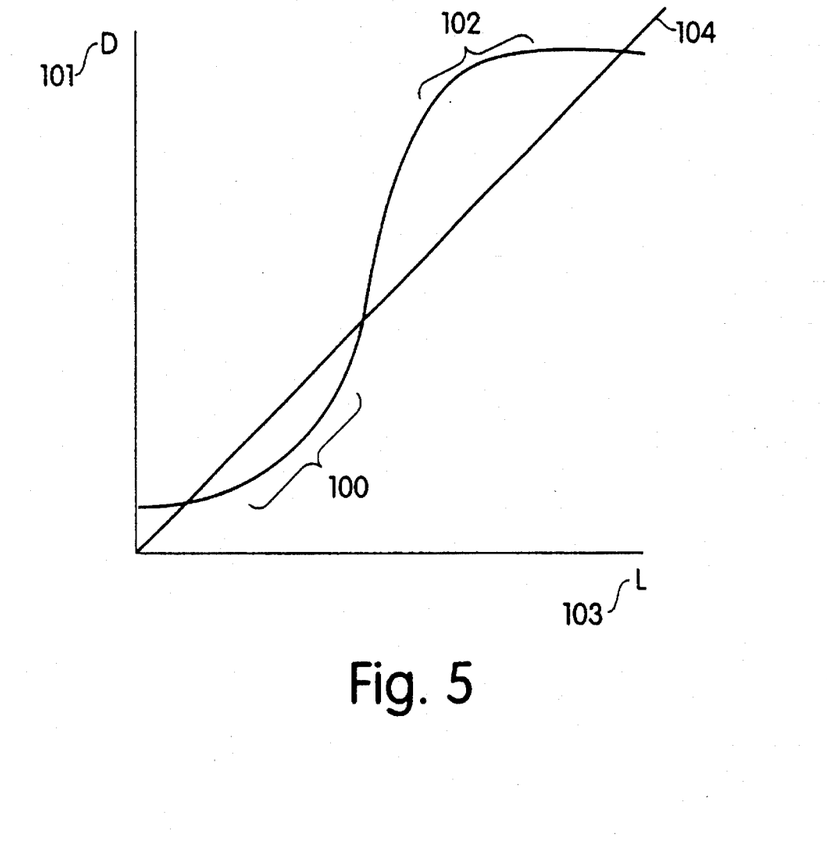
FIG. 5 is a sketch of a response curve for photographic film plotting density of pigmentation against level of illumination.

According to another aspect of the invention, the composition system can compensate for non-linearities in film response. Referring to FIG. 5, the density of pigmentation 101 of film resulting from a given exposure level 103 varies in a non-linear manner. The response curve for such a film generally includes what are known in the art as a toe portion 100 and a shoulder portion 102 in its deviation from an ideal response 104. Curves for specific film types are usually available from motion picture film manufacturers.

Figure 6:
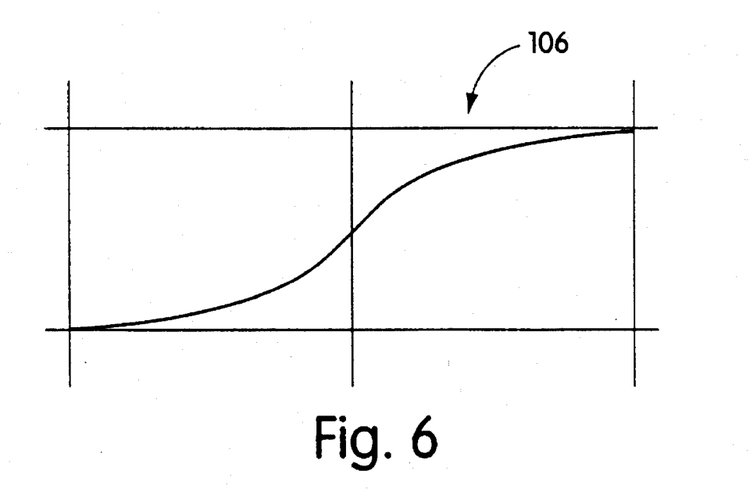
FIG. 6 is a schematic diagram of a transition using the film of FIG. 5.

In the generation of a transition, the ends of the scene to be used in the transition are generally printed by exposing them to linearly increasing levels of light. Because the film responds to light in a non-linear way, the resulting transition 106 will also be non-linear, as illustrated in FIG. 6. These transitions start out with a low rate of change from the first scene to the second scene. The rate of change then increases, and finally tapers off towards the end of the transition. This effect is generally absent in electronically-generated video transitions.

The non-linear transition characteristics of film, however, can be more pleasing to the eye. Furthermore, it is often advantageous to perform the bulk of the editing of a piece using a computerized composition system and then transfer the edits to a final film copy. It is therefore useful to provide transitions in the composition system that will simulate the ultimate effect on film.

Referring to FIGS. 1 and 2, the storage 18 of the composition system 10 may hold a series of response curve data tables for various types of film. When using the system, the user may select one of these tables for a desired film type to adjust the parameters of the transition to be played back on the display interface 30. The system then retrieves values from the selected table and determines from them the relative intensities for concurrently displaying frames from the first and second scenes during the transition. For example, in the beginning of the transition of FIG. 6, frames from the first scene will be displayed more brightly relative to the first scene than they would in a linear transition. This is because the intensity of the first frames of the first scene are being affected by the table values corresponding to the shoulder portion 102 of the selected film's response, and the intensity of the first frames of the second scene are being affected by the table values corresponding to the toe portion 100 (see FIG. 5).

The non-linear characteristics of a film type can be applied to displaying a transition in different ways. In one approach, the non-linear film characteristics are applied to the individual pixels in the two scenes in the transition. In an alternative approach, the non-linear film characteristic is applied to the frame as a whole.

Figure 7:
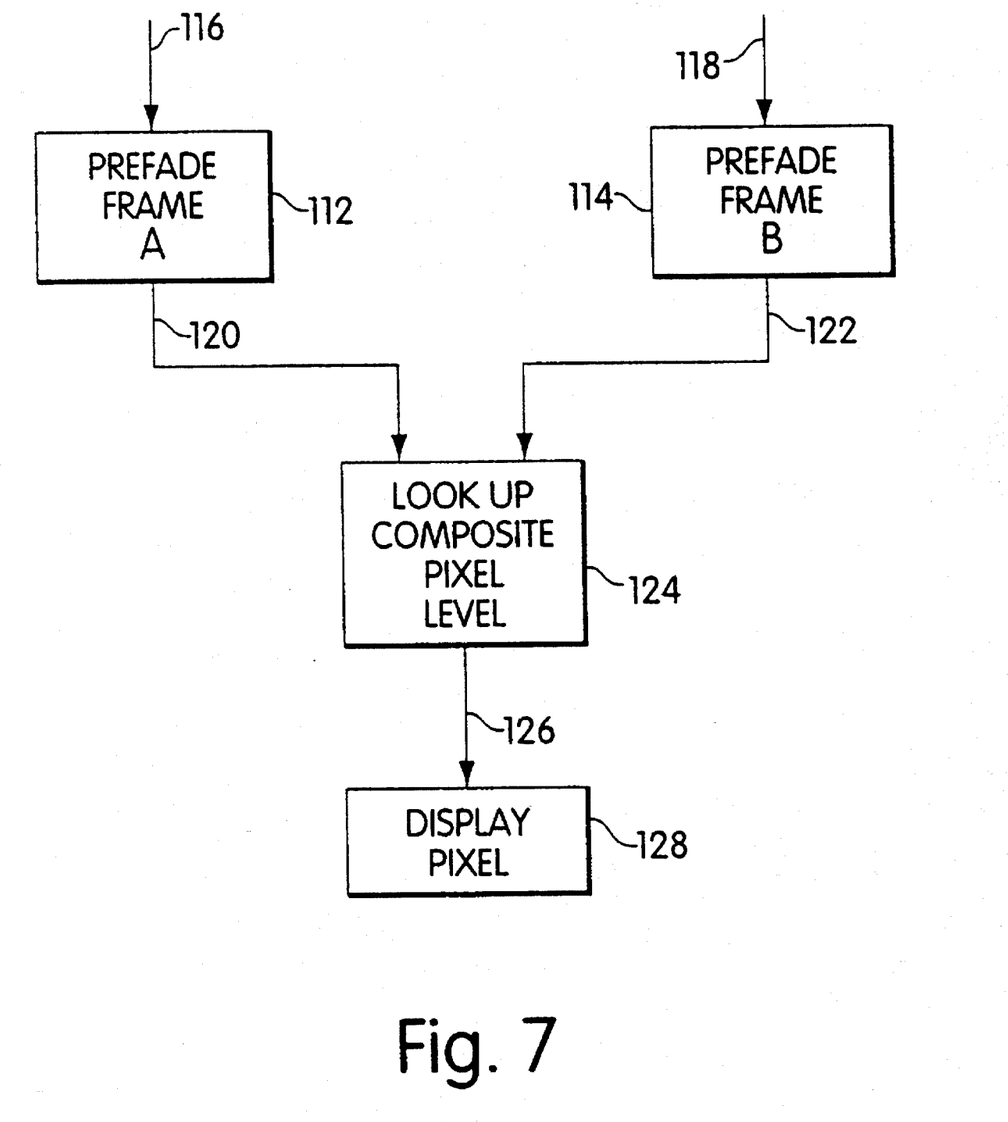
FIG. 7 is a flow diagram illustrating the generation and display of a non-linear transition.

In the first approach, referring to FIGS. 1 and 7, once the player module 14 has received transition information 21 from the transition display module 12, it creates and displays the transition in the following manner. The player module begins by retrieving, from a pixel sequence 116 for the first scene, the first pixel for the first frame which is to appear in the transition. The player module also retrieves, from a pixel sequence 118 for the second scene, the first pixel for the first frame which is to appear in the transition.

The player module then prefades each of these pixels (steps 112, 114), to obtain first and second prefaded pixel values 120, 122. The prefading operations adjust the relative intensity of the pixels in the two frames, by multiplying them by respective complementary floating point blending factors. The player module then combines the two prefaded values to form an address, and uses that address to access a stored table (step 124). The entry in the table accessed by that address is a composite pixel value 126, which can be displayed on the display 40 (step 128).

The player module then repeats these operations for the remaining pixels in the first frames of the first and second scenes. The result is that a blended first frame is displayed. In an ordinary dissolve, the blending factors each stay the same for all pixels of each blended frame.

These operations are then again applied successively to the pixels in the remaining frames in the transition. In an ordinary dissolve, the first blending factor decreases linearly as the transition progresses, and the second blending factor increases linearly as time progresses. This causes the first scene to fade out as the second scene fades in.

These blending factors add up to a value of one throughout the transition. For example, at a point in the transition that calls for the first scene to be displayed twice as brightly as the second frame, the blending factor for the first scene will be ⅔, and the blending factor for the second scene will be ⅓. The prefaded pixel value 120 for the pixel in the first frame would therefore be reduced in intensity by ⅓, and the prefaded pixel value 122 for the pixel in the second frame would be reduced in intensity by ⅔. It is noted that if the prefaded values were to be added for the whole transition, instead of being transformed by the table, the result would be a linear video fade.

The table contains response curve data for a particular type of film, which allows the transition to be displayed as a non-linear transition. Each entry in the table holds a precomputed composite pixel value accessed by an address made up of both the prefaded pixel values 120, 122. This precomputed value corresponds to the sum of these two pixels after their intensities have each been adjusted according to their corresponding positions on the film characteristic. It is noted that the table can be precomputed for two different film characteristics, one for the first scene, and one for the second. One of those characteristics could be linear.

This approach to displaying a transition results in portions of individual frames fading in and fading out at different rates, depending on their intensity level and the chosen film characteristic curve. This quality of a transition is visibly discernable by the user, and may produce desirable aesthetic effects.

Consider, for example, fading away from a first scene which includes the face of a black cat with bright green eyes and sitting against a dark background. With the film characteristic shown in FIG. 5, the eyes of the cat will tend to persist in the displayed material after the outline of the cat's face has disappeared. This is because the brighter portions of the frame tend to be affected by the knee 102 of the characteristic until later in the transition, and the darker portions of the frame are affected by the toe 100 of the characteristic earlier in the transition.

The motion picture composing system according the invention can also store arbitrary or user-specified non-linear response curves. These response curves may provide certain desired effects to a transition. One possible arbitrary characteristic would be a characteristic similar to that of FIG. 5, but mirrored about the ideal response 104. In fading away from a scene, with this characteristic, the dark portions of the scene will tend to persist longer than the lighter portions of the scene. In fading away from the cat's face, for example, the silhouette of the cat would tend to persist as the eyes of the cat grow dimmer. By allowing users to experiment with these characteristics, they can obtain a variety of different aesthetic effects for the transition.

The second approach to displaying non-linear transitions differs from the first in that the prefading operations 112, 114 are not carried out linearly over time, and the look-up operation 124 is replaced with a summing operation. In this type of transition, the prefading operations follow a representative film characteristic, such that all of the intensities in the same frames fade in or out at the same rate. This representative film characteristic can, for example, track the transition that a pixel of 50% intensity would follow using the first approach.

The second approach is not an accurate reproduction of the mechanism traditionally used to create film transitions, but produces a transition that resembles a film transition more closely than does a linear video transition. In particular, this type of transition will follow the general cadence of a film transition, but it will not have the selective fading characteristics described above. Generating this type of transition generally requires fewer computational resources, however, than the type of transition generated using the first approach.

It is common to employ compressed video information in composing digitally stored video images. For example, JPEG, MPEG, and other discrete cosine transform (DCT) compression methods can be used. These generally end with a multiplication step, and this multiplication step can be modified to perform the prefading operations as well.

For example, in a system employing the JPEG compression standard, a final operation is a conversion between YUV 4:2:2 and RGB formats, and this conversion is generally performed with a 3×3 vector matrix multiplication operation. In this type of system, the elements in the transformation matrix can all be multiplied by the blending factor, such that only a single multiplication operation is required to both convert and prefade. The multiplication can take place in a dedicated JPEG compression processor, with the table look-up or addition steps being performed by a host system. This results in efficient generation of the transitions for both the first and second approaches.

Alternatively, the transitions can be partially or fully computed by a dedicated video processor. This can be done either before or after converting from YUV 4:2:2 to RGB representations, but YUV 4:2:2 representations can be more compact and may require fewer operations. Since such processors generally have reduced amounts of memory, it may be useful to fold the film characteristic table (if it is symmetrical—i.e., one film characteristic is used for both scenes), or otherwise compress it. One type of processor which can be used to perform this sort of processing is described in a published PCT application No. WO94/24815 published Oct. 27, 1994 designating the United States, entitled: "Meda Pipeline with Multichannel Video Processing and Playback", by Jeffrey Kurtze et al., assigned to Avid Technology, Inc., filed on Apr. 18, 1994, and which is herein incorporated by reference.

It is noted that in the traditional course of generating film transitions, the characteristics of two films are involved. The first film is a positive-type film, which is used to film the scenes, and the second is a negative-type film which is used in the transition printing process. It is therefore desirable to develop composite transition characteristic tables to take both films into account. These composite curves can be derived by convolving the two individual film characteristic curves.

A system according to the invention may also permit motion in the transition display windows. This allows editors to define these points in a dynamic fashion. For example, certain moving scenes are easier to edit while the editor is perceiving the tempo of the scene. In an embodiment permitting these types of dynamic transition editing functions, further buttons may be provided on the button bars, such as buttons having play, fast forward, rewind, jog and shuttle functions. It is noted that the four transition display windows need not display the first and last frames of the transition, but instead may display the frames immediately preceding and immediately following the transition.

The system according to the invention also permits versatile editing operations on the soundtrack of motion picture material. Although this type of transition only affects audio information, it can be specified easily using the transition display windows. For example, the user might want to create the effect of a door opening with a train outside of the door. With the system of the invention, the user may create this effect by defining a transition on one or more of the audio tracks of the material from background room sounds to train noise. This transition may be defined to start at the first frame in which the door starts to open, which is easily found using the transition display windows.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A transition editing method for creating a transition between a first sequence of video frames and a second sequence of video frames, comprising:

storing a table of values that express a non-linear response to certain levels of light, generating a transition between the first and second sequences, and adjusting the intensity at which material of the first sequence is displayed relative to the intensity at which material of the second sequence is displayed within the transition based on the values stored in the step of storing.

2. The method of claim 1 further including storing a further table of values that express a further non-linear response to certain levels of light.

3. The method of claim 1 wherein the step of storing a table of values stores values which define a toe portion and a shoulder portion.

4. The method of claim 1 wherein the step of storing a table of values stores values that express a non-linear response of a certain type of film to certain levels of light.

5. The method of claim 4 further including storing a further table of values that express a further non-linear response of a further certain type of film to certain levels of light, and wherein the steps of storing a table of values and a further table of values each store values which define a toe portion and a shoulder portion.

6. The transition editing method of claim 1 further including the step of defining the non-linear response in the table in accordance with user input.

7. The transition editing method of claim 1 wherein the step of adjusting is performed on a pixel-by-pixel basis.

8. The method of claim 7 wherein the step of storing a table of values stores values that express a non-linear response of a certain type of film to certain levels of light.

9. The transition editing method of claim 7 wherein the step of adjusting includes a step of prefading of the material in the first sequence, a step of prefading of the material in the second sequence, and a seep of looking up one of the values in the table.

10. The transition editing method of claim 9 wherein the step of looking up one of the values is a table look-up step based on an address derived from the results of both the steps of prefading.

11. The method of claim 10 wherein the step of storing a table of values stores values that express a non-linear response of a certain type of film to certain levels of light.

12. The transition editing method of claim 11 wherein the step of prefading is performed as part of a color space transformation.

13. The transition editing method of claim 1 wherein the step of adjusting is performed on a frame-by-frame basis.

14. The method of claim 13 wherein the step of storing a table of values stores values that express a non-linear response of a certain type of film to certain levels of light.

15. The transition editing method of claim 13 wherein the step of adjusting includes a step of prefading of the material in the first sequence, a step of prefading of the material in the second sequence, and a step of adding results of the step of prefading of the material in the first sequence and the step of prefading of the material in the second sequence.

16. The method of claim 15 wherein the step of storing a table of values stores values that express a non-linear response of a certain type of film to certain levels of light.

17. The transition editing method of claim 16 wherein the step of prefading is performed as part of a color space transformation.

18. A transition editing method for creating a transition between a first sequence of video frames and a second sequence of video frames, comprising:

storing a table of values each expressing the response of a certain type of film to a certain level of light, generating a transition between the first and second sequences, and adjusting the intensity at which the frames of the first sequence are displayed relative to the intensity at which the frames of the second sequence are displayed within the transition based on the values stored in the step of storing.

19. The method of claim 18 further including storing a further table of values each expressing the response of a further certain type of film to a certain level of light.

20. The method of claim 18 wherein the step of storing a table of values stores values which define a toe portion and a shoulder portion.

21. The method of claim 20 further including storing a further table of values each expressing the response of a further certain type of film to a certain level of light, and wherein the steps of storing a table of values and a further table of values each store values which define a toe portion and a shoulder portion.

22. A transition editing method for creating a transition between a first sequence of video frames and a second sequence of video frames, comprising:

storing a table of values defining a non-linear relationship, generating a transition between the first and second sequences, and adjusting on a pixel-by-pixel basis the intensity at which material of the first sequence is displayed within the transition, the degree of adjustment of intensity of pixels in the material being based on the values stored in the step of storing and on the intensity of those pixels in the material.

23. The transition editing method of claim 22 wherein the step of generating a transition generates a fade-out, and wherein one of the first and second sequences is a blank sequence.

24. The transition editing method of claim 22 wherein the step of generating a transition generates a cross-fade.

25. The transition editing method of claim 22 wherein the step of generating a transition generates a transition that begins with the first sequence and ends with the second sequence.

26. The transition editing method of claim 22 further including the step of defining the non-linear response in the table in accordance with user input.

27. The transition editing method of claim 22 wherein the step of adjusting is performed on a pixel-by-pixel basis.

28. A transition editing method for creating a transition between a first sequence of video frames and a second sequence of video frames, comprising:

storing a table of values defining a non-linear relationship, wherein the step of storing a table of values stores values that express a non-linear response of a certain type of film to certain levels of light, generating a transition between the first and second sequences, and adjusting the intensity at which first material of the first sequence are displayed relative to the intensity at which second material of the first sequence is displayed with in the transition based on the values stored in the step of storing.

29. A transition editing method for creating a transition between a first sequence of video frames and a second sequence of video frames, comprising:

storing a table of values defining a non-linear relationship, generating a transition between the first and second sequences, adjusting on a pixel-by basis the intensity at which first material of the first sequence are displayed relative to the intensity at which second material of the first sequence is displayed within the transition based on the values stored in the step of storing, wherein the step of adjusting includes a step of prefading of the material in the first sequence, a step of prefading of the material in the second sequence, and a step of looking up one of the values in the table.

30. The transition editing method of claim 29 wherein the step of looking up one of the values is a table look-up step based on an address derived from the results of both the steps of prefading.

31. The method of claim 30 wherein the step of storing a table of values stores a table of values that express a non-linear response of film to certain levels of light.

32. A media composing system comprising:

storage for a first sequence of motion picture frames and a second sequence of motion picture frames, and a table of values that express a non-linear response to certain levels of light, a user input device, a transition display module responsive to the storage and the user input device to generate a transition between the first and second sequences, and adjust the intensity at which material of the first sequence is displayed relative to the intensity at which material of the second sequence is displayed within the transition based on the values stored in the step of storing.

33. The media composing system of claim 32 wherein the table storage is responsive to user input from the input device to define the table of values.

34. The media composing system of claim 32 wherein the the transition display module includes:

means for prefading the material in the first sequence, means for prefading the material in the second sequence, and lookup table means responsive to the means for prefading the first sequence and to the means for prefading the second sequence.

35. The media composing system of claim 32 wherein the the transition display module includes:

means for prefading the material in the first sequence, means for prefading the material in the second sequence, and adding means responsive to the means for prefading the first sequence and to the means for prefading the second sequence.

* * * * *